United States Patent [19]

Boegh

[11] Patent Number: 4,943,211
[45] Date of Patent: Jul. 24, 1990

[54] SAND FILTER CLEANING SYSTEM

[76] Inventor: Alan D. V. Boegh, 201 Grace Blvd., Altamonte Springs, Fla. 32714

[21] Appl. No.: 1,043

[22] Filed: Jan. 7, 1987

[51] Int. Cl.$^5$ ............................................. F04F 5/44
[52] U.S. Cl. .................................... 417/131; 417/151; 210/169
[58] Field of Search ...................... 417/151, 181, 198; 210/269; 137/147

[56] References Cited

U.S. PATENT DOCUMENTS

| 307,855 | 11/1884 | Haughan | 417/181 X |
| 1,643,025 | 9/1927 | Meggenhofen | 417/181 |
| 1,842,043 | 1/1932 | Modra et al. | 417/181 X |
| 2,044,088 | 6/1936 | Lord | 417/151 |
| 2,068,363 | 1/1937 | Wetmore et al. | 417/151 X |
| 2,161,895 | 6/1939 | Brenner | 417/151 X |
| 3,323,468 | 6/1967 | Thompson | 417/181 |

FOREIGN PATENT DOCUMENTS

| 215426 | 6/1956 | Australia | 417/181 |
| 132914 | 8/1902 | Fed. Rep. of Germany | 210/269 |
| 117399 | 7/1983 | Japan | 417/151 |
| 141440 | 12/1960 | U.S.S.R. | 210/269 |
| 954639 | 8/1982 | U.S.S.R. | 417/151 |

Primary Examiner—Leonard E. Smith
Assistant Examiner—Robert N. Blackmon
Attorney, Agent, or Firm—William M. Hobby, III

[57] ABSTRACT

A sand filter cleaning apparatus includes a suction head having an enlarged intake opening for sucking materials thereinto attached to an exhaust hose for receiving material sucked into the suction head. A water pressure hose is connected between a water source under pressure and the suction head for directing water under pressure into the suction head. The suction head has a jet nozzle positioned to direct water under pressure from the water pressure hose towards the exhaust hose to create a suction therein in the suction head opening and a second nozzle for directing water under pressure in front of the opening of the suction head to thereby stir up material in front of the suction head. The exhaust hose is positioned to increase the pressure with a siphon by having a longer drop leg than the intake leg of the exhaust hose.

5 Claims, 1 Drawing Sheet

U.S. Patent
Jul. 24, 1990
4,943,211
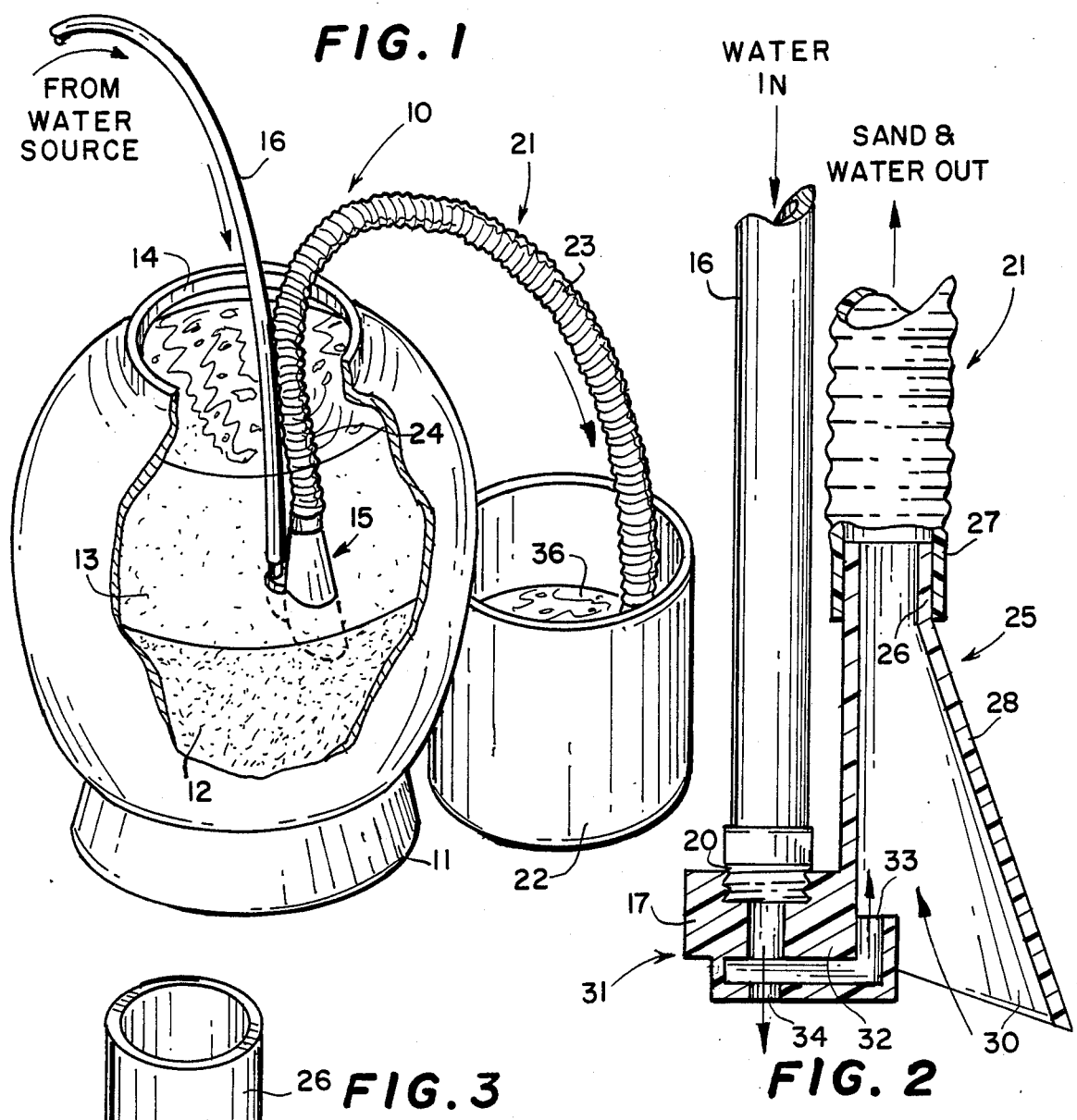
FIG. 1
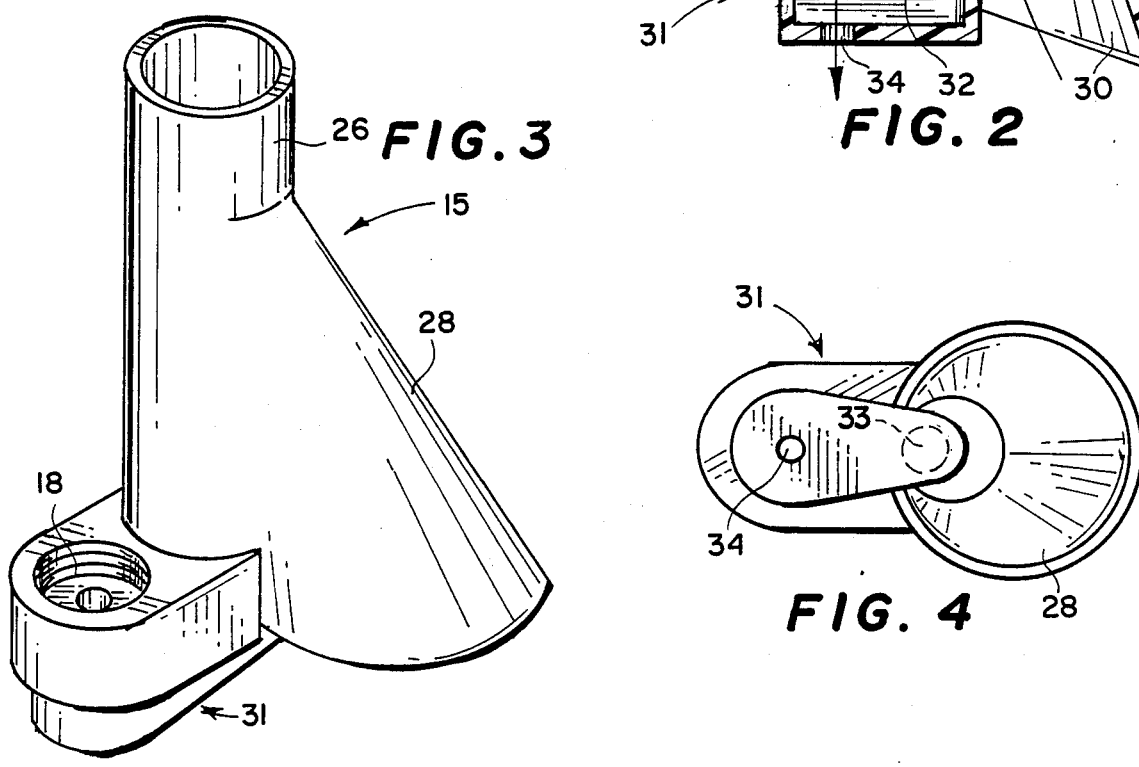
FIG. 2
FIG. 3
FIG. 4

SAND FILTER CLEANING SYSTEM

BACKGROUND OF THE INVENTION

The present invention relates to a sand filter cleaning system and especially to a cleaning system having a vacuum head which stirs up the material for suction into the system.

In the past various types of suction head devices have been utilized for a variety of cleaning purposes. These include such diverse systems as vacuum cleaners for home and industrial use. Swimming pool cleaners suck water through a water pump and draw water through a vacuum nozzle to capture settled materials along the pool bottom which are then collected in a filter element. Typical prior art filtering systems for swimming pools include sand filters which consist of sand placed in a container such as a large stainless steel tank and has the water being drawn into the tank through the sand and out of the tank so that the solid materials in the water is captured by the sand. Sand filters are one of the oldest type filtering systems and are commonly cleaned by reversing the direction of the pumped water to wash out the waste collected in the sand. The present invention is directed towards a system for removing sand or filtering materials from swimming pool filtering systems which is required for predetermined periods after long use of the sand filter. The present system can be operated from the water pressure from a municipal water supply and combines a jet action suction with a siphon and further provides for stirring up the compacted sand for removal through an exhaust hose into a catch bucket.

Cleaning systems which use jet pumps have been well known in the prior art and include U.S. Pat. No. 1,842,043 to W. Modra, et al, for a Siphon Pump, which directs water pressure into a suction head and towards a suction hose for drawing material into the inlet. In the U.S. Pat. No. 307,855, to Haughan for a Flue Cleaner, water pressure is applied directly to a pipe having an enlarged suction opening for cleaning flues and chimneys. In U.S. Pat. No. 1,643,025 to C. W. Meggenhoffen, a vessel emptying or filling appliance uses a jet action from water tap pressure for filling or emptying a vessel below the wash basin. Similarly, the O. A. Parker U.S. Pat. No. 2,741,997 has a Water Jet Pump which works on an aspiration technique aspirating water adjacent a venturi. In the N. W. Wheeler U.S. Pat. No. 51,249, dated 1865, a steam boiler cleaner applies a jet pressure through a jet nozzle pipe while the Baer U.S. Pat. No. 4,400,138 has a multiple jet eductor directing multiple jets into a pipe for dredging deposits for the recovery of mine materials.

SUMMARY OF THE INVENTION

A sand filter cleaning system is provided which has a suction head with an enlarged intake opening for sucking materials thereinto. An exhaust hose is connected to the suction head for receiving materials sucked into the suction head and a water pressure hose is connected between the water source under pressure and through the suction head for directing water under pressure into the suction head. The suction head has a jet nozzle positioned to direct water under pressure from the water pressure hose towards the exhaust hose to create a suction in the suction head opening and the suction head has the means to stir up materials in front of the vacuum head including a second water pressure nozzle positioned to direct water under pressure from the water pressure hose in front of the opening of the suction head thereby loosening the material for removal from the sand filter under water pressure. The system also combines the jet action with a siphon utilizing the exhaust hose having a longer down than the up leg while cleaning its sand filter to increase the suction in the suction head. This allows the sand filter to be cleaned by the removal of sand using ordinary tap water in a municipal water system.

BRIEF DESCRIPTION OF THE DRAWINGS

Other objects features and advantages of the present invention will be apparent from the written description and the drawings in which:

FIG. 1 is a cut-away perspective of a sand filter cleaning system in accordance with the present invention;

FIG. 2 is a partial cross-sectional view of the suction head for the sand filter cleaning system in accordance with FIG. 1;

FIG. 3 is a perspective view of the suction head for the sand filtering cleaning system in accordance with FIG. 1; and FIG. 4 is a bottom elevation of the suction head of FIG. 3.

DETAILED DESCRIPTION OF THE PREFERRED EMBODIMENT

Referring to FIGS. 1 through 4 of the drawings, a sand filter cleaning system 10 is illustrated placed in a sand filter 11 partially filled with sand 12 and having water 13 in the container. The sand filter has a top opening 14 and has the sand filter cleaning system suction head 15 therein. Suction head 15 has the water pressure hose 16, which may be an ordinary garden hose, connected to the municipal water supply through an ordinary water tap and is connected to the suction head 15 which has internal threads 17 in an opening 18 for receiving the external threaded nipple 20 of the garden hose 16. The exhaust hose 21 may be a flexible filter type hose and is connected to the suction head 15 and empties into a collection bucket 22. The collection bucket 22 is placed to provide a longer down leg 23 for the hose 21 than the up leg 24 so that a siphon action can be created in the exhaust hose 21. The main body 25 of the suction head 15 has a slightly tapered cylindrical portion 26 for attaching the hose end 27 of the hose 21.

The suction head main body 25 has a generally truncated cone-shaped body 28 with an enlarged suction opening 30 which is used to draw the sand 12 and water 13 thereinto through the exhaust hose 21 and into the container 22. The inlet water pressure suction 31 of the suction head 25 directs water through a channel 32 into a water jet 33 aimed up the suction head 25 towards the exhaust pipe 21 to create a jet action for drawing water and sand into the opening 30 and through the exhaust pipe 21. The pressure housing 31 also has a second outlet and nozzle 34 for directing water under pressure out of the suction head in front of the suction head for stirring up sand directly therebeneath and under the opening 30 of the suction head. The combination of the stirring up of the sand in the water assists in the sand being pulled into the opening 30 by the jet action of the jet opening 33. However to increase the suction, a siphon action is increased in which the up leg 24 is shorter than the down or drop leg 23 and both ends of the hose 21 are under the water 13 and 36. Once the tube 21 is filled with water, siphon action is created which has pressure created by the falling water in the down leg 23. This works in combination with the jet action from the jet nozzle 33 to create a greater suction for lifting the sand and waste materials. This combination of the jet nozzlele 34 directed directly into the sand for stirring up the sand with the siphon and jet suction nozzle greatly enhances the removal of sand from pool filters which generally have small openings 14 which make it difficult to get at the sand.

It should be clear at this point that a sand filter cleaning system has been provided for cleaning swimming pool sand filters by removing the sand. However, the present invention is not to be considered as limited to the form shown which are to be considered illustrative rather than restrictive.

I claim:

1. A sand filter cleaning system comprising in combination:

a suction head having an enlarged intake opening for sucking materials thereinto;

an exhaust hose connected to said suction head for receiving materials sucked through said suction head;

a water pressure hose connected between a water source under pressure and said suction head for directing water under pressure into said suction head;

said suction head having a jet nozzle positioned to direct water under pressure from said water pressure hose toward said exhaust hose to create a suction in said suction head opening, and said suction head having means to stir up material in the mouth of said suction head, said means having a second water pressure nozzle positioned to direct water under pressure in front of the opening of said suction head whereby sand and other materials can be removed from a sand filter with water under pressure; and means for creating a siphon in said exhaust hose to increase the suction therein whereby the sand in the sand filter can be cleaned.

2. A sand filter cleaning system in accordance with claim 1 in which said water pressure hose is a garden hose having a threaded connector on one end and said suction head has an internally threaded connector for attaching said garden hose thereto.

3. A sand filter cleaning system in accordance with claim 2 in which said suction head means to stir up materials in front of said suction head including a second water pressure nozzle has an opening directly in front of the exit from said garden hose.

4. A sand filter cleaning system in accordance with claim 3 in which said suction head includes a generally cone-shaped suction head having a pressure housing mounted adjacent thereto having said jet nozzle and second nozzle openings formed therein.

5. A sand filter cleaning system in accordance with claim 4 in which said suction head has a slightly tapered cylindrical shaped end portion for attaching said exhaust hose.

* * * * *

UNITED STATES PATENT AND TRADEMARK OFFICE
CERTIFICATE OF CORRECTION

PATENT NO. : 4,943,211

DATED : July 24, 1990

INVENTOR(S) : Alan D. V. Boegh

It is certified that error appears in the above-identified patent and that said Letters Patent is hereby corrected as shown below:

On the title page, under item [19] and in item [76]:

The inventor's last name should read: "Vander Boegh" rather than "Boegh".

Signed and Sealed this

Seventh Day of January, 1992

Attest:

HARRY F. MANBECK, JR.

*Attesting Officer*      *Commissioner of Patents and Trademarks*